(12) United States Patent
Thiagarajan et al.

(10) Patent No.: US 9,589,230 B1
(45) Date of Patent: Mar. 7, 2017

(54) ENTITY LOCATION TRACEABILITY AND PREDICTION

(71) Applicant: EMC Corporation, Hopkinton, MA (US)

(72) Inventors: Senthil Kumar Thiagarajan, Bangalore (IN); Shikhar Pandey, Bangalore (IN); Shalini Sharma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 713 days.

(21) Appl. No.: 14/040,052

(22) Filed: Sep. 27, 2013

(51) Int. Cl.
*G06F 17/00* (2006.01)
*G06N 5/02* (2006.01)
*G06N 5/04* (2006.01)

(52) U.S. Cl.
CPC ...................... *G06N 5/04* (2013.01)

(58) Field of Classification Search
None
See application file for complete search history.

(56) References Cited

U.S. PATENT DOCUMENTS

| | | | | |
|---|---|---|---|---|
| 2014/0278070 A1* | 9/2014 | McGavran | ............. | G01C 21/00 701/465 |
| 2014/0279196 A1* | 9/2014 | Wilson | ............... | G06Q 30/0631 705/26.7 |
| 2015/0081349 A1* | 3/2015 | Johndrow | .......... | G06Q 20/3224 705/5 |

OTHER PUBLICATIONS

Bao et al. "Location-based and Preference-Aware Recommendation Using Sparse Geo-Social Networking Data", ACM SIGSPATIAL GIS'12, 2012, pp. 10.*
Monreale et al. "WhereNext: a Location Predictor on Trajectory Pattern Mining", KDD, 2009, pp. 637-645.*
P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Li-Wu Chang
(74) *Attorney, Agent, or Firm* — Ryan, Mason & Lewis, LLP

(57) ABSTRACT

Activity-related data associated with a subject entity is obtained. Weight values are assigned to portions of the obtained activity-related data, wherein the weight values range between a low entity location-predictive weight value to a high entity location-predictive weight value, and wherein the portions of obtained activity-related data form a plurality of data paths. The assigned weight values are added along each data path of obtained activity-related data to compute a plurality of data path weight values. A past, present and/or future location of the subject entity is determined based on a selection of one of the plurality of data path weight values. For example, the location associated with the data path with the highest data path weight value is selected as the location of the subject entity.

20 Claims, 19 Drawing Sheets

FIG. 4A

*PREDICTION ALGORITHM (PHASE 1)*
MOBILE SIGNAL AVAILABLE

THE LOCATION THAT SIGNAL IDENTIFIER IS POINTING TO IS:
1.1) BASE CITY
1.2) CITY KNOWN (CITY VISITED, TRAVEL HISTORY)
1.3) TRAVEL PLANS
1.4) UNKNOWN LOCATION (NEW LOCATION OR CONTINUES CHANGING LOCATION)

┌─ 402 ──────────────────────────┐  ┌─ 406 ──────────────────────────┐
│           UNKNOWN LOCATION     │  │           CITY KNOWN           │
│ A  CALENDAR SHOWING DIFFERENT  │  │ C  FREQUENTLY TRAVELED LOCATION│
│    LOCATION                    │  │ C  CALENDAR SHOWING SAME LOCATION│
│ A  MOBILE SIGNAL CONTINUOUSLY  │  │ C  SOCIAL DATA (TAGGING) ALSO  │
│    CHANGING FOR A NOT DEFINED  │  │    SHOWING SAME LOCATION       │
│    ROUTE                       │  │                                │
│ A  SOCIAL MEDIA DATA (POSTS,   │  │                                │
│    TAGGING)                    │  │                                │
└────────────────────────────────┘  └────────────────────────────────┘

┌─ 404 ──────────────────────────┐  ┌─ 408 ──────────────────────────┐
│           TRAVEL PLAN          │  │           BASE CITY            │
│ B  TRAVEL DATA                 │  │ C  INPUT CITY NAME BY ENTITY ITSELF│
│ B  CONTINUES CHANGING LOCATION │  │ C  OFFICE LOCATION             │
│    BUT FROM ONE DEFINED ROUTE  │  │ C  SOCIAL CHECK IN             │
│    FROM PAST OR HISTORY LOCATION│ │ C  HOME LOCATION               │
│ B  CALENDAR CONFIRMS SAME      │  │                                │
│    LOCATION                    │  │                                │
└────────────────────────────────┘  └────────────────────────────────┘

┌─ 401 ──────────────────────────┐
│             LEGEND             │
│ A  LOW WEIGHT VALUE ASSIGNED   │
│ B  MEDIUM WEIGHT VALUE IS ASSIGNED│
│ C  HIGH WEIGHT VALUE IS ASSIGNED│
└────────────────────────────────┘

FIG. 4B

*PREDICTION ALGORITHM (PHASE 1.1)*
  MOBILE SIGNAL AVAILABLE
    ↳ LOCATION CONFIRMED AS BASE CITY

420

| OFFICE LOCATION | HOME |
|---|---|
| A  TIME (OFFICE HOURS) | C  TIME (OUT OF OFFICE HOURS) |
| A  CALENDAR MEETING | C  CALENDAR DETAILS |
| A  SOCIAL CHECK IN | C  SOCIAL CHECK IN |
| A  PAST MOBILE SIGNAL | C  NO TRAVEL DETAILS |
|  | C  PAST CONTINUOUS LOCATION OF SIGNAL (30 MINS) |

| NEARBY MARKET/RESTRAUNT etc. | UNKNOWN LOCATION |
|---|---|
| B  TIME TO/OF VISIT | C  TRAVELING WITHIN CITY |
| B  HISTORY VISITS MATCH | C  NOT DEFINED LOCATION IN CITY |
| B  SOCIAL CHECK IN | C  IN TRANSIT OR HEADING TO A KNOWN LOCATION |
| B  BOOKING/TICKET BUYING |  |
| B  CREDIT/DEBIT CARD SWIPING |  |
| B  CELEBRATION DAY |  |

| LEGEND |
|---|
| A  LOW WEIGHT VALUE ASSIGNED |
| B  MEDIUM WEIGHT VALUE IS ASSIGNED |
| C  HIGH WEIGHT VALUE IS ASSIGNED |

FIG. 4C

*PREDICTION ALGORITHM (PHASE 1.2)*
  MOBILE SIGNAL AVAILABLE
    ↳ LOCATION CONFIRMED AS OTHER CITY (KNOWN PLACE)

| PUBLIC PLACES | |
|---|---|
| A | TRAVEL TIME |
| A | TICKET BOOKING |
| A | SOCIAL CHECK IN |

| HISTORY LOCATIONS | |
|---|---|
| C | HISTORY LOCATION VISITED |
| C | TRAVEL DATA |
| C | CALENDAR DATA |
| C | SOCIAL CHECK IN |

| OFFICE CONFIRM PLACES | |
|---|---|
| B | HISTORY VISITS |
| B | SOCIAL CHECK IN |
| B | CALENDAR |

| UNKNOWN LOCATION | |
|---|---|
| C | NO HISTORY DATA |
| C | SOCIAL CHECK IN |
| C | CALENDAR DATA |

| LEGEND | |
|---|---|
| A | LOW WEIGHT VALUE ASSIGNED |
| B | MEDIUM WEIGHT VALUE IS ASSIGNED |
| C | HIGH WEIGHT VALUE IS ASSIGNED |

FIG. 4D

*PREDICTION ALGORITHM (PHASE 1.3)*
  MOBILE SIGNAL AVAILABLE
    ↳ LOCATION CONFIRMED IN TRAVEL

460

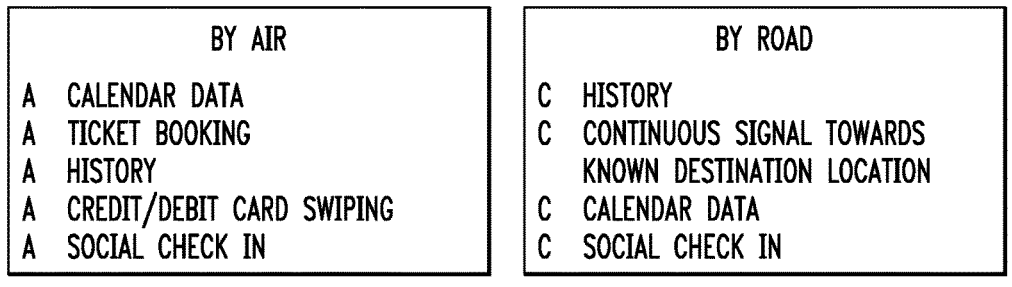

| BY AIR | BY ROAD |
|---|---|
| A CALENDAR DATA | C HISTORY |
| A TICKET BOOKING | C CONTINUOUS SIGNAL TOWARDS KNOWN DESTINATION LOCATION |
| A HISTORY | C CALENDAR DATA |
| A CREDIT/DEBIT CARD SWIPING | C SOCIAL CHECK IN |
| A SOCIAL CHECK IN | |

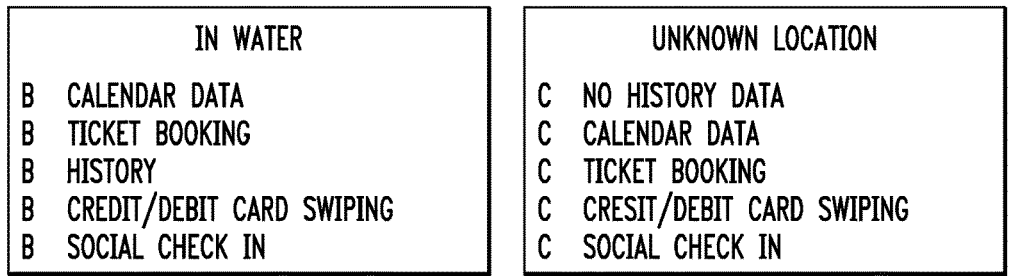

| IN WATER | UNKNOWN LOCATION |
|---|---|
| B CALENDAR DATA | C NO HISTORY DATA |
| B TICKET BOOKING | C CALENDAR DATA |
| B HISTORY | C TICKET BOOKING |
| B CREDIT/DEBIT CARD SWIPING | C CRESIT/DEBIT CARD SWIPING |
| B SOCIAL CHECK IN | C SOCIAL CHECK IN |

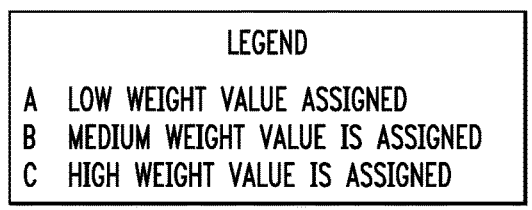

| LEGEND |
|---|
| A LOW WEIGHT VALUE ASSIGNED |
| B MEDIUM WEIGHT VALUE IS ASSIGNED |
| C HIGH WEIGHT VALUE IS ASSIGNED |

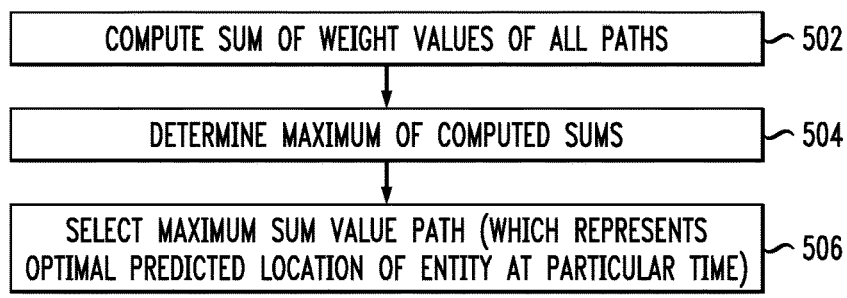

- 502 COMPUTE SUM OF WEIGHT VALUES OF ALL PATHS
- 504 DETERMINE MAXIMUM OF COMPUTED SUMS
- 506 SELECT MAXIMUM SUM VALUE PATH (WHICH REPRESENTS OPTIMAL PREDICTED LOCATION OF ENTITY AT PARTICULAR TIME)

FIG. 6A

| USER AND RELATED ACTORS | LOCATION | TIME | SOURCE |
|---|---|---|---|
| MARK | WOODY ISLAND (HOPKINTON) | 7am | MOBILE SIGNAL |
| MARK | WOODY ISLAND (HOPKINTON) | 7:30am | MOBILE SIGNAL |
| MARK | WOODY ISLAND (HOPKINTON) | 7:40am | GTALK LOGIN |
| MARK | EMC OFFICE – SOUTH ST. | 8:10am | MOBILE SIGNAL |
| MARK | EMC OFFICE – SOUTH ST. | 8:30am | MOBILE SIGNAL |
| MARK | EMC OFFICE – SOUTH ST. | 9:50am | FB LOCATION SHARING |
| MARK | EMC OFFICE – SOUTH ST. | 12pm | MOBILE SIGNAL |
| MARK | EMC OFFICE – SOUTH ST. | 12:15pm | MOBILE SIGNAL |
| MARK | SOUTH ST. ROAD | 2:15pm | MOBILE SIGNAL |
| MARK | MASSACHUSETTS TURNPIKE (TOLL ROAD) | 2:25pm | MOBILE SIGNAL |
| MARK | BREAKNECK HILL CONSERVATION LAND | 3pm | FACEBOOK CHECK IN-USER |
| MARK | WEST NEWTON | 3:15pm | MOBILE SIGNAL |
| MARK | TRINITY CHURCH | 5pm | MOBILE SIGNAL |
| MARK | BOSTON PUBLIC LIBRARY | 6pm | PETER TAGGED MARK |

600

MEAN = (8+4)/2 = 6

SUM OF WEIGHT OF PATH 1 = 6+8+5+9 = 28
SUM OF WEIGHT OF PATH 2 = 6+3+7+2 = 18
MAX [SUM (WEIGHT)] = 28, HENCE WE CHOOSE PATH 1
THEREFORE PERCENTAGE OF WEIGHT = (28/40)*100 = 70%

HENCE THERE IS 70% POSSIBILITY/CHANCE THAT MARK IS BETWEEN WOODY ISLAND ROAD AND SOUTH ST. ROAD TILL 2:15 pm.

CASE-2: WHERE WILL MARK BE AROUND 7 pm?
MOBILE SIGNAL AVAILABLE FOR MARK
  ▢ LOCATION CAPTURED IS BASE CITY (HOPKINTON)
  ▢ HISTORY LOCATIONS (BOSTON)

| KNOWN CITY/PLACES | BASE CITY |
|---|---|
| • MOBILE SIGNAL AVAILABLE AT 2:15pm, 2:25pm, 3:15pm, 5pm → 9<br>• SOCIAL CHECK IN AT 3pm, 6pm → 8 | |
| TRAVEL | UNKNOWN PLACE |

HENCE THERE IS 75% POSSIBILITY/CHANCE THAT MARK IN BOSTON AT AROUND 7 pm.

SUM OF WEIGHT OF PATH 1 = 4+0+0+0 = 4
SUM OF WEIGHT OF PATH 2 = 4+0+0+0 = 4
MAX [SUM (WEIGHT)] = 4, HENCE WE CHOOSE PATH 1 OR PATH 2
THEREFORE PERCENTAGE OF WEIGHT = (4/40)*100 = 10%

HENCE THERE IS 10% POSSIBILITY/CHANCE THAT MARK IS AT SOUTH ST. ROAD EXACTLY AT 2:15 pm.

ENTITY LOCATION TRACEABILITY AND PREDICTION

FIELD

The field relates to data processing systems, and more particularly to techniques for tracking the location of an entity through such data processing systems.

BACKGROUND

Tracking an entity, such as an individual, is a task that has varied applications. For example, in a corporate application, it may be necessary for the corporation to know the location of an employee, who travels globally on behalf of the corporation, for business and/or security reasons.

The use of radio frequency identification (RFID) tags is one manner in which an employee's location can be determined. However, RFID tags can be lost and the coverage of the tracking function is only as wide as the area in which RFID tag readers are deployed. This type of tracking approach, as well as other existing approaches, also fails to determine a future location of an entity.

Accordingly, a need exists for improved entity tracking techniques.

SUMMARY

Embodiments of the invention provide techniques for tracking the location of an entity.

In one embodiment, a method comprises the following steps. Activity-related data associated with a subject entity is obtained. Weight values are assigned to portions of the obtained activity-related data, wherein the weight values range between a low entity location-predictive weight value to a high entity location-predictive weight value, and wherein the portions of obtained activity-related data form a plurality of data paths. The assigned weight values are added along each data path of obtained activity-related data to compute a plurality of data path weight values. At least one of a past, present and future location of the subject entity is determined based on a selection of one of the plurality of data path weight values. For example, the location associated with the data path with the highest data path weight value is selected as the location of the subject entity.

In another embodiment, an article of manufacture is provided which comprises a processor-readable storage medium having encoded therein executable code of one or more software programs. The one or more software programs when executed by at least one processing device implement steps of the above-described method.

In yet another embodiment, an apparatus comprises a memory and a processor operatively coupled to the memory and configured to perform steps of the above-described method.

Advantageously, illustrative embodiments described herein provide techniques that identify the location of a user at any given time, and predict location for a future time. Such techniques can be applied to a variety of applications including, but not limited to, corporate, governmental, security, and personal applications.

These and other features and advantages of the present invention will become more readily apparent from the accompanying drawings and the following detailed description.

BRIEF DESCRIPTION OF THE DRAWINGS

FIGS. 4A through 4D show a prediction methodology, in accordance with one embodiment of the invention.

FIG. 5A shows a path flow methodology, in accordance with one embodiment of the invention.

FIG. 6A shows a data sheet with location data for one or more use case examples, in accordance with one embodiment of the invention.

FIGS. 6D and 6E show a second use case example, in accordance with one embodiment of the invention.

DETAILED DESCRIPTION

Embodiments of the present invention will be described herein with reference to exemplary information processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "information processing system," "computing system," "distributed computing system" and "data storage system" as used herein are intended to be broadly construed, so as to encompass, for example, private or public cloud computing and/or storage systems, as well as other types of systems comprising distributed virtual and/or physical infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the term "enterprise" refers to a business, company, firm, venture, organization, operation, concern, corporation, establishment, partnership, a group of one or more persons, or some combination thereof.

As used herein, the term "entity" refers to a person. However, embodiments of the invention are adaptable in a straightforward manner to apply to an object.

Figure 1:
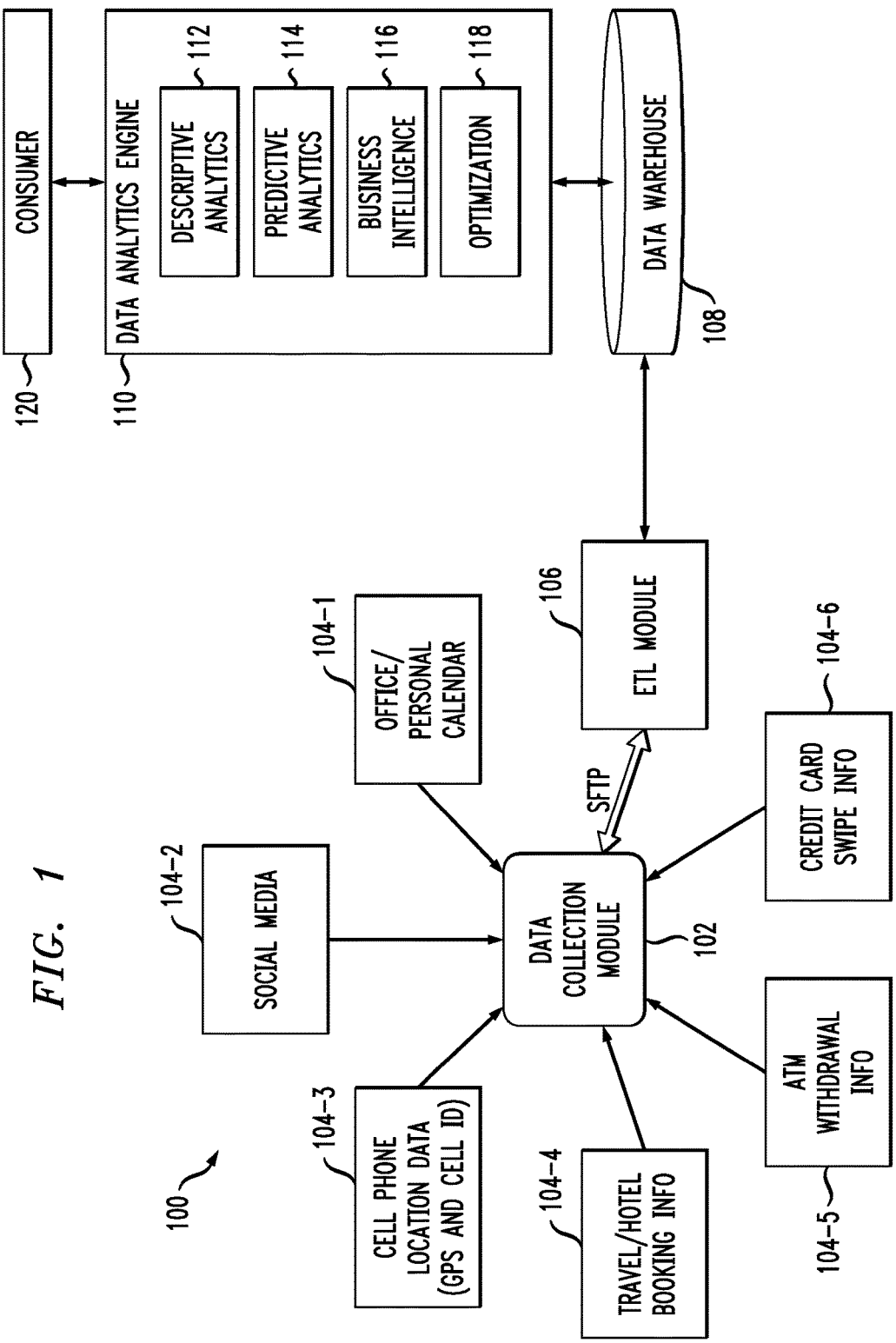
FIG. 1 shows an entity location traceability and prediction system environment, in accordance with one embodiment of the invention.

FIG. 1 shows an entity location traceability and prediction system environment 100, in accordance with one embodiment of the invention. As shown, a data collection module 102 collects (captures) data from a plurality of data sources. The plurality of data sources includes, but is not limited to, office and/or personal electronic calendar data 104-1, social media data 104-2 (e.g., Twitter, Facebook, LinkedIn, Google Talk, etc.), mobile device data 104-3 (e.g., a mobile signal indicating global positioning system (GPS) location data of cellular phone and cellular phone identifier), travel data 104-4 (e.g., booking, check-in, boarding information regarding flight, cruise, bus, railways and/or hotel), monetary transaction data 104-5 (e.g., automatic teller machine (ATM) withdrawal data such as location of ATM where withdrawal occurred), and purchase data 104-6 (e.g., credit card swipe information such as location of point of sale). Such data is collectively an example of "activity-related data." The data represented by 104-1 through 104-6 can be collected from various systems and devices (public and private) that are operatively coupled to the data collection module 102. The data can be pulled from the data sources and/or pushed by the data sources.

The data collection module 102 is operatively coupled to an Extract, Transform and Load (ETL) module 106. As is known, ETL is a process in data warehousing wherein data is extracted from one or more outside data sources, transformed to fit operational needs (e.g., quality of service levels) and/or storage formats, and loaded into a target data warehouse. Thus, in this embodiment, ETL module 106 extracts data collected by the data collection module 102, transforms it to a given format and/or operational need, and then loads it into a data warehouse 108.

A data analytics engine 110 is operatively coupled to the data warehouse 108. The data analytics engine 110 analyzes all or portions of the data stored in the data warehouse 108, as will be explained in detail below, and provides a location prediction result regarding one or more subject entities to a user or other system (consumer or requestor) 120. The data analytics engine 110 includes a descriptive analytics module 112, a predictive analytics module 114, a business intelligence module 116, and an optimization module 118. These modules are examples of processing modules associated with an analytics function which, in general, attempts to obtain new insights and understanding of performance of an operation based on data and statistical methods. In this case, the analytics function is a tracing and location prediction function with respect to a subject entity.

The descriptive analytics module 112 analyzes the data and obtains descriptive information about the data. For example, this includes quantitatively describing the main features of a collection of data (data from the data warehouse 108). This descriptive information is used by the predictive analytics module 114 to execute a prediction algorithm (as will be described below in the context of FIGS. 4A and 4D) along with business intelligence module 116, which can be used to provide business related metrics, when needed or preferred, that yield information about the subject entity's activities (in the context of a business scenario). Thus, the descriptive analytics answers, for example, the question of "who" and "where" in a past or present context from historical data, while the predictive analytics answers the question, for example, "where will this person be in the future." However, it can also predict where a person was or currently is if that is not known from existing data. The optimization module 118 assists in selecting the optimal location prediction using a path flow algorithm (as will be described below in the context of FIGS. 5A and 5B).

Although the components 102 through 118 are shown as separate in FIG. 1, these components or portions thereof may be implemented at least in part on a common processing platform. In other embodiments, components 102 through 118 may each be implemented on a separate processing platform. It is also to be understood that a given embodiment may include multiple instances of the components 102 through 118, although only single instances of such components are shown in the system diagram for clarity and simplicity of illustration.

Figure 2:
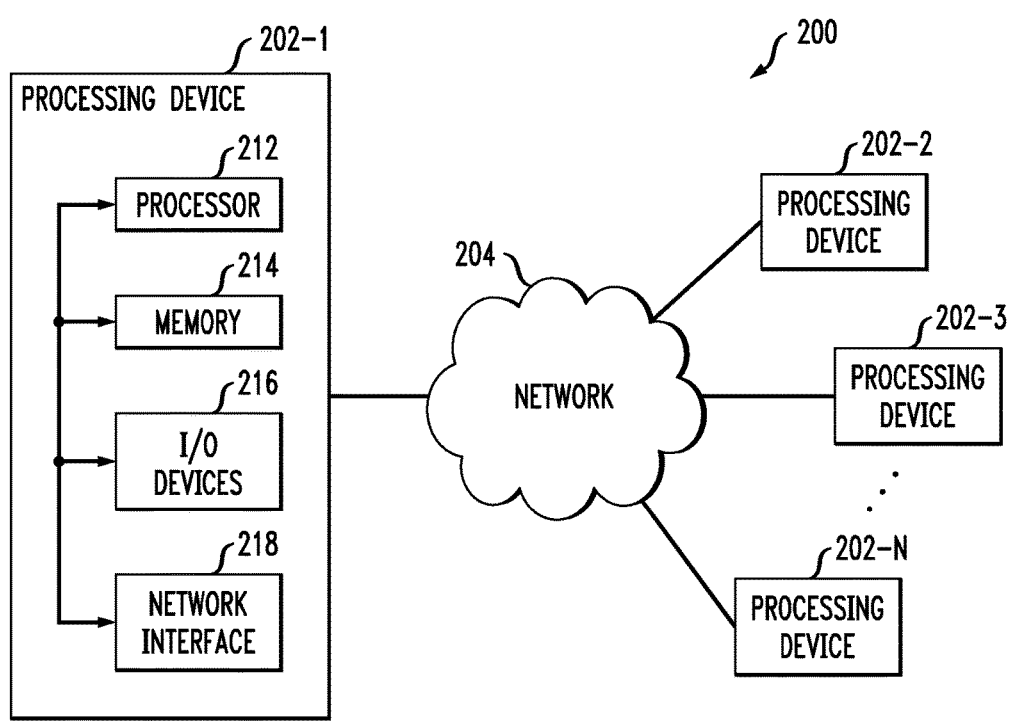
FIG. 2 shows a processing platform on which the entity location traceability and prediction system of FIG. 1 is implemented, in accordance with one embodiment of the invention.

An example of a processing platform on which the system environment 100 of FIG. 1 may be implemented is information processing platform 200 shown in FIG. 2. The processing platform 200 in this embodiment comprises a plurality of processing devices, denoted 202-1, 202-2, 202-3, . . . 202-N, which communicate with one another over a network 204. The data sources 104-1 through 104-6, the data collection module 102, the ETL module 106, the data warehouse 108, the data analytics engine 110, and each of modules 112 through 118, may each run on a server, computer or other processing platform element, which may be viewed as an example of what is more generally referred to herein as a "processing device." Note that one or more processing devices in FIG. 2 may be servers, while one or more processing devices may be client devices. As illustrated in FIG. 2, such a device generally comprises at least one processor and an associated memory, and implements one or more functional modules for controlling features of the system environment 100. Again, multiple elements or modules may be implemented by a single processing device in a given embodiment.

The processing device 202-1 in the processing platform 200 comprises a processor 212 coupled to a memory 214. The processor 212 may comprise a microprocessor, a microcontroller, an application-specific integrated circuit (ASIC), a field programmable gate array (FPGA) or other type of processing circuitry, as well as portions or combinations of such circuitry elements.

Components of a computing system as disclosed herein can be implemented at least in part in the form of one or more software programs stored in memory and executed by a processor of a processing device such as processor 212. Memory 214 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 214 may comprise electronic memory such as random access memory (RAM), read-only memory (ROM) or other types of memory, in any combination. The one or more software programs when executed by a processing device such as the processing device 202-1 causes the device to perform functions associated with one or more of the elements/components of system environment 100. One skilled in the art would be readily able to implement such software given the teachings provided herein. Other examples of processor-readable storage media embodying embodiments of the invention may include, for example, optical or magnetic disks. Processing device 202-1 also includes input/output (I/O) devices 216.

Processing device 202-1 also includes network interface circuitry 218, which is used to interface the device with the network 204 and other system components. Such circuitry may comprise conventional transceivers of a type well known in the art.

The other processing devices 202 of the processing platform 200 are assumed to be configured in a manner similar to that shown for processing device 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 200 may include additional or alternative processing platforms, as well as numerous distinct processing platforms in any combination.

Also, numerous other arrangements of servers, clients, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Furthermore, it is to be appreciated that the processing platform 200 of FIG. 2 can comprise virtual machines (VMs) implemented using a hypervisor. A hypervisor is an example of what is more generally referred to herein as "virtualization infrastructure." The hypervisor runs on physical infrastructure. As such, the data analytics and management techniques illustratively described herein can be provided in accordance with one or more cloud services. The cloud services thus run on respective ones of the virtual machines under the control of the hypervisor. Processing platform 200 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 200 in one or more embodiments of the invention is the VMware vSphere® (VMware Inc. of Palo Alto, Calif.) which may have an associated virtual infrastructure management system such as the VMware vCenter®. The underlying physical infrastructure may comprise one or more distributed processing platforms that include storage products such as VNX® and Symmetrix VMAX®, both commercially available from EMC Corporation of Hopkinton, Mass. A variety of other computing and storage products may be utilized to implement the one or more cloud services that provide the entity location traceability and prediction functionality and features described herein.

Embodiments of the invention, as will be illustrated in the context of FIGS. 3A through 6G below, provide a method that comprises the following steps. Activity-related data associated with a subject entity is obtained. This may include evaluating activity-related data associated with the subject entity, and capturing the activity-related data based on the evaluation. Weight values are assigned to portions of the obtained activity-related data. These weight values range between a low entity location-predictive weight value to a high entity location-predictive weight value. Further, the portions of obtained activity-related data form a plurality of data paths. The assigned weight values are added along each data path of obtained activity-related data to compute a plurality of data path weight values. A past, present and/or future location of the subject entity is determined based on a selection of one of the plurality of data path weight values.

FIGS. 3A through 3E illustrate examples of evaluating activity-related data associated with the subject entity, and capturing the activity-related data based on the evaluation.

Figure 3A:
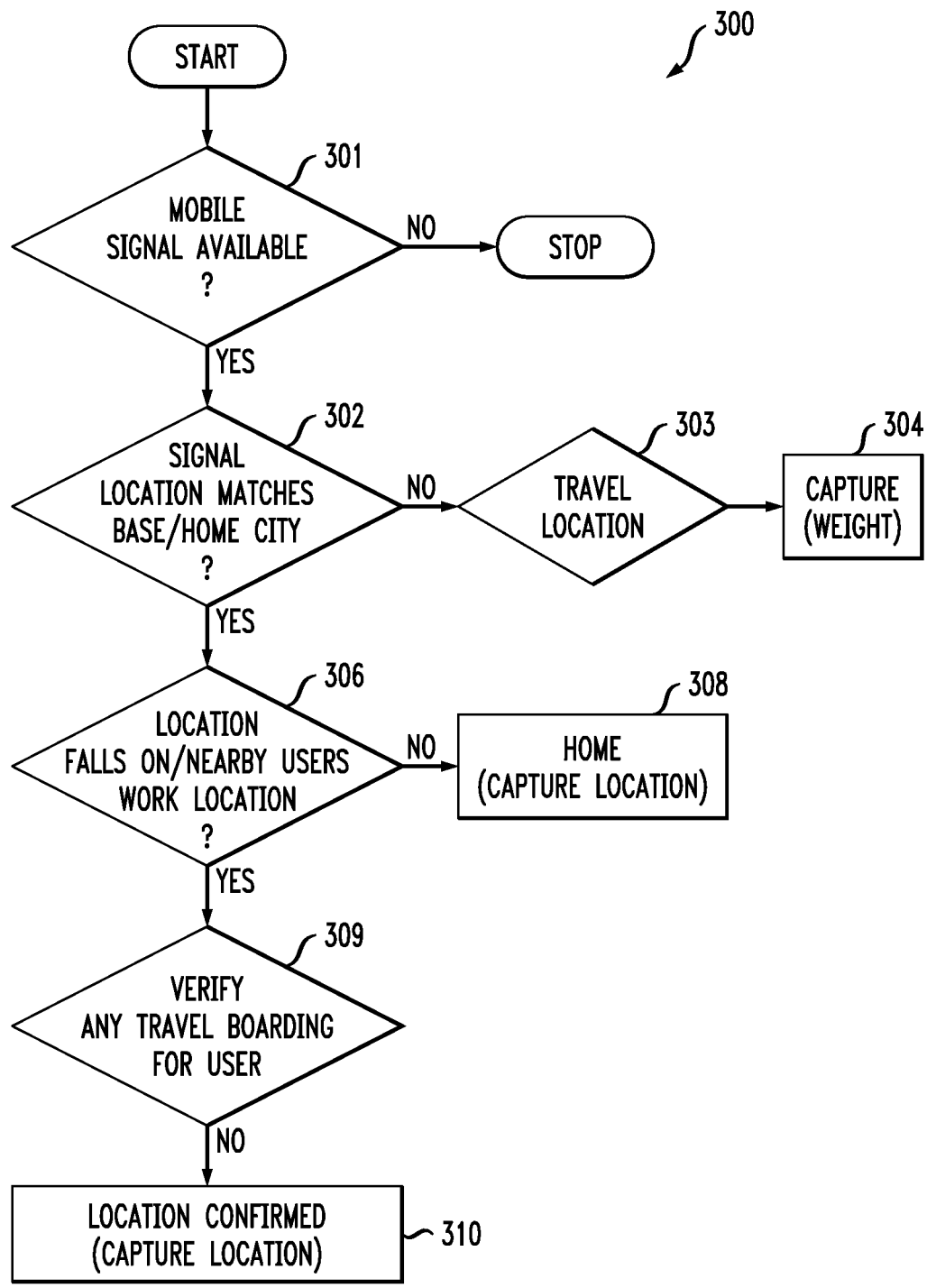
FIG. 3A shows a user type assertion flow diagram, in accordance with one embodiment of the invention.

More particularly, FIG. 3A shows a user type assertion flow diagram 300, in accordance with one embodiment of the invention. In step 301, a determination is made whether or not a mobile signal associated with a mobile device of the subject entity is available. If yes, then in step 302, a determination is made whether or not the signal matches a base/home city of the subject entity. If no, then it is assumed that the subject entity is in a travel city in step 303. This travel city location is captured, in step 304, and given an (relatively high) entity location-predictive weight value. However, if in step 302, the signal location is in the base/home city of the subject entity, then in step 306, it is determined whether the location of the signal falls on or nearby the work location of the subject entity. If no, it is assumed in step 308 that the location of the signal is the home of the subject entity, and the home location is captured and given an (relatively high) entity location-predictive weight value. If, however, the signal is at or near the work location, verification is made in step 309 whether or not the subject entity has any travel boarding or booking plans. If not, then the work location is confirmed, captured and given an (relatively high) entity location-predictive weight value in step 310.

Figure 3B:
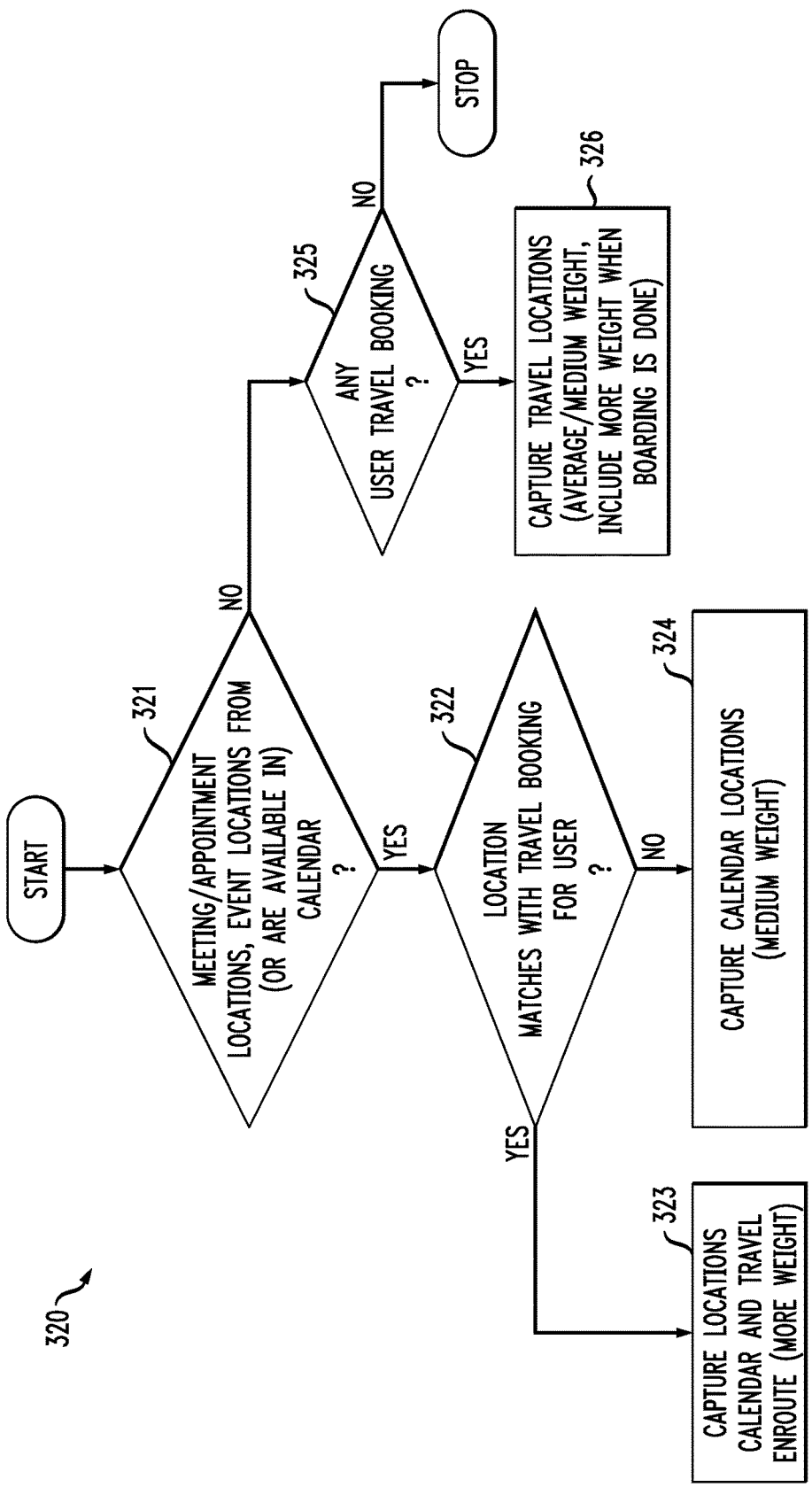
FIG. 3B shows a nomadic user flow diagram, in accordance with one embodiment of the invention.

FIG. 3B shows a nomadic user flow diagram 320, in accordance with one embodiment of the invention. In step 321, a determination is made whether or not any electronic calendar data is available for the subject entity (e.g., meeting/appointment locations, event locations, etc.). If yes, then in step 322, it is determined whether or not location information in the electronic calendar matches with a travel booking for the subject entity. If yes, the travel location(s) is captured in step 323 and given an entity location-predictive weight value. If no, then the calendar appointment location(s) is captured and given a medium entity location-predictive weight value in step 324. Going back to step 321, if no meeting/appointment locations or event locations are available in the electronic calendar, then in step 325, it is determined whether or not there is any travel booking. If yes, the travel location(s) is captured in step 326. An average weight value is assigned, unless the subject entity is currently boarding the mode of transportation, in which case a higher weight value is assigned.

Figure 3C:
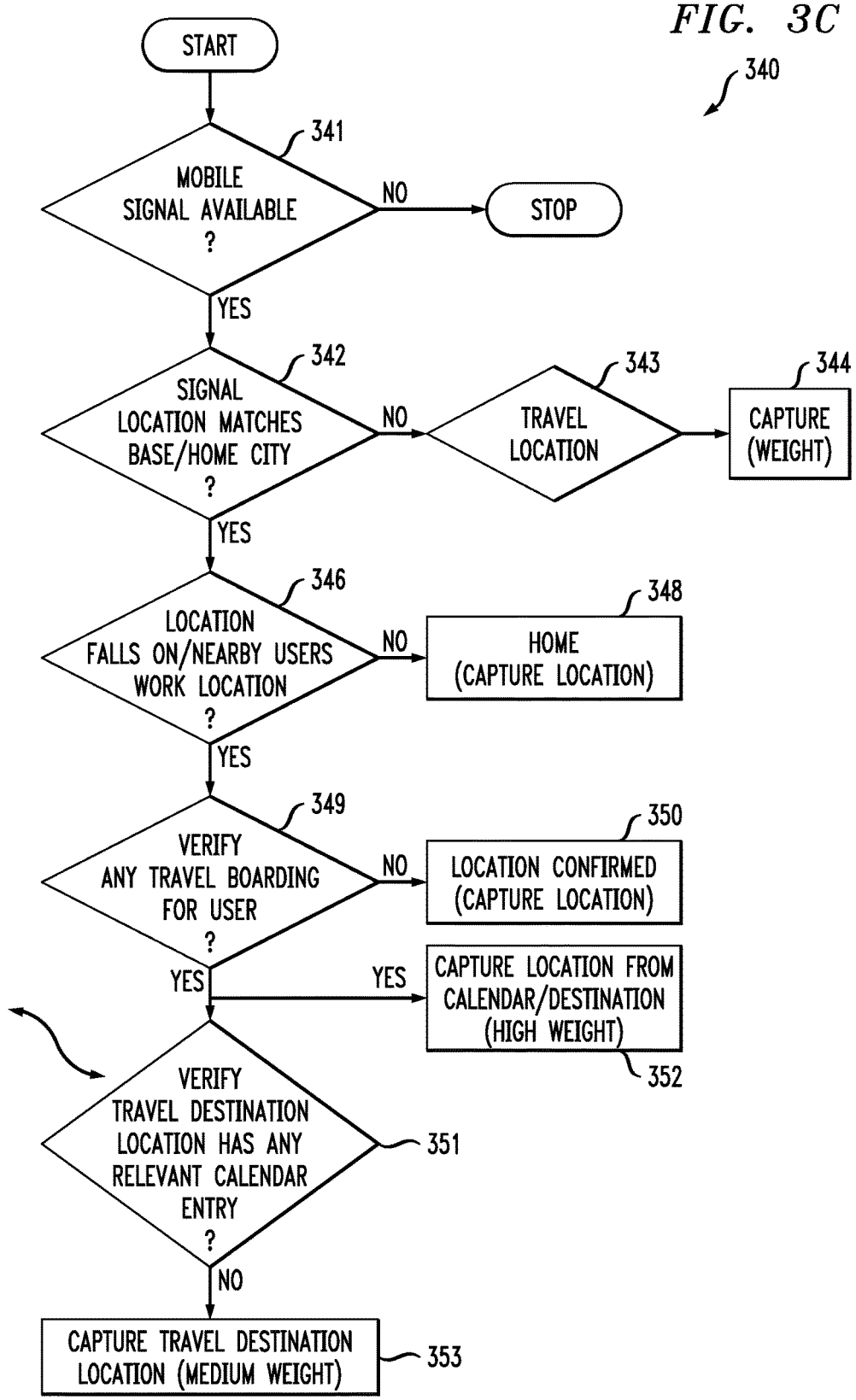
FIG. 3C shows a home location user flow diagram, in accordance with one embodiment of the invention.

FIG. 3C shows a home location user flow diagram 340, in accordance with one embodiment of the invention. In step 341, a determination is made whether or not a mobile signal associated with a mobile device of the given entity is available. If yes, then in step 342, a determination is made whether or not the signal matches a base/home city of the subject entity. If no, then it is assumed that the subject entity is in a travel city in step 343. This travel city location is captured, in step 344, and given an (relatively high) entity location-predictive weight value. However, if in step 342, the signal location is in the base/home city of the subject entity, then in step 346, it is determined whether the location of the signal falls on or nearby the work location of the subject entity. If no, it is assumed in step 348 that the location of the signal is the home of the subject entity, and the home location is captured and given an (relatively high) entity location-predictive weight value. If, however, the signal is at or near the work location, verification is made in step 349 whether or not the subject entity has any travel boarding or booking plans. If not, then the work location is confirmed, captured and given an (relatively high) entity location-predictive weight value in step 350. If yes, then in step 351, verification is made whether or not the travel destination location has any relevant electronic calendar entries for the subject entity. If yes, in step 352, the method captures the travel destination location from the electronic calendar, and gives the location a relatively high weight value. If no, in step 353, the method captures the travel destination location, and gives the location a relatively average (medium) weight value.

Figure 3D:
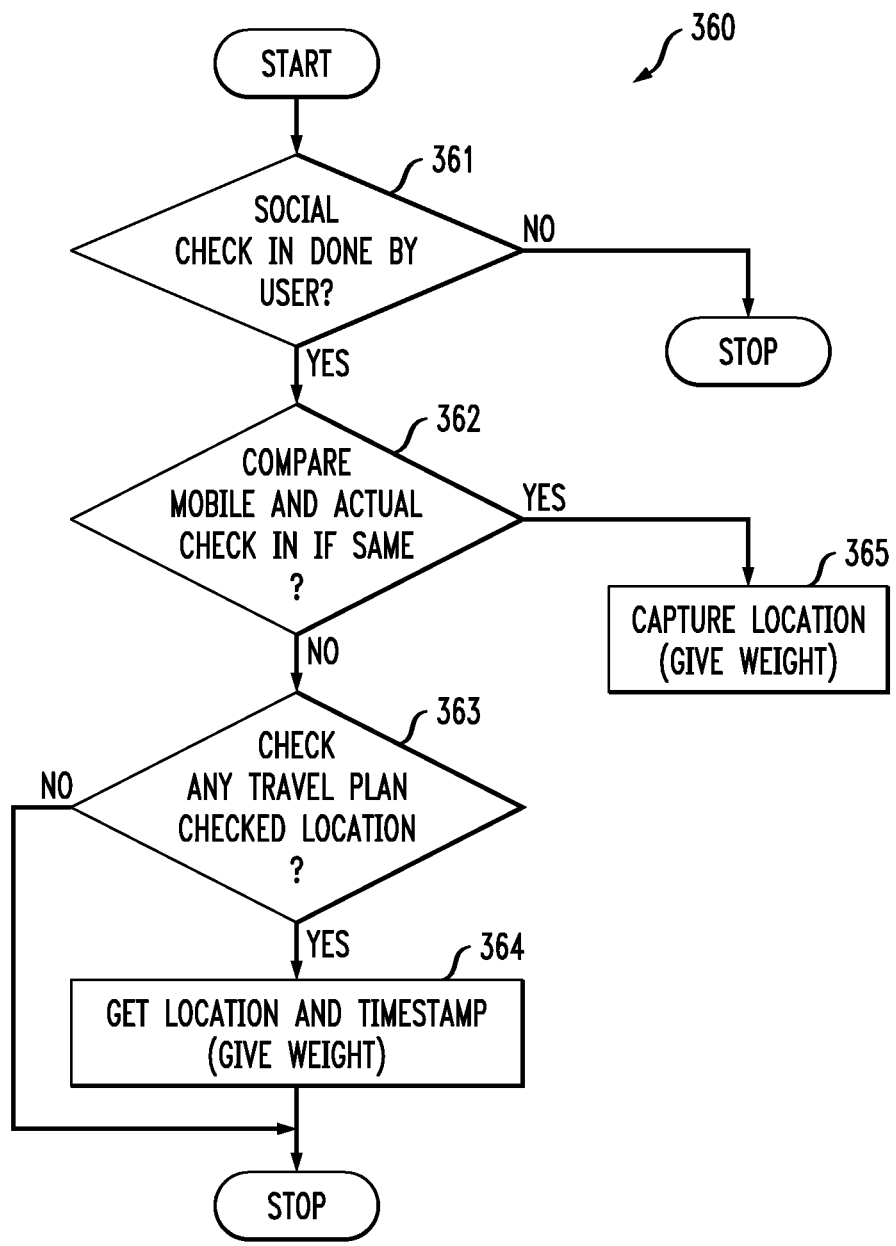
FIG. 3D shows a social data capture flow diagram, in accordance with one embodiment of the invention.

FIG. 3D shows a social data capture flow diagram 360, in accordance with one embodiment of the invention. Step 361 checks whether or not the subject entity has checked in (e.g., signed in) on a social media website. If yes, step 362 compares whether mobile and actual check in are the same. If no, step 363 checks any travel plan and travel location. If there is a travel location for the subject entity, step 364 captures location and timestamp and assigns a weight value. If the mobile and actual check in are the same, steps 365 captures the location and assigns a weight value.

Figure 3E:
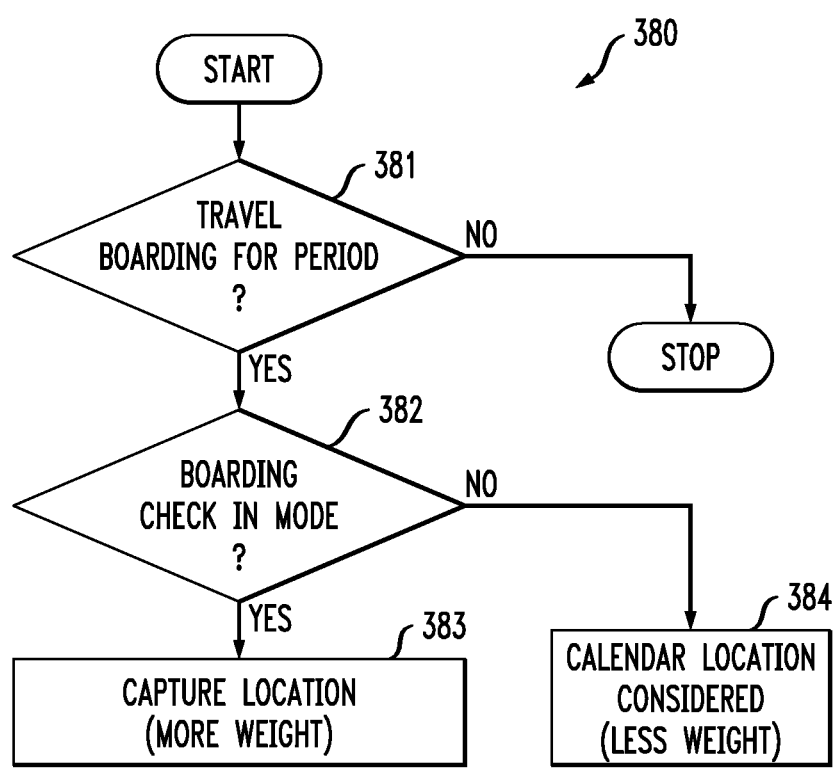
FIG. 3E shows a travel data capture flow diagram, in accordance with one embodiment of the invention.

FIG. 3E shows a travel data capture flow diagram 380, in accordance with one embodiment of the invention. Step 381 checks for a travel boarding period (i.e., is subject entity scheduled to be boarding a mode of transportation now—this data is available from electronic calendar of the subject entity). If yes, then step 382 checks for boarding check in mode (i.e., is subject entity actually boarding now). If yes, step 383 captures the travel location and assigns a relatively high weight value. If no, in step 384, the scheduled travel location from the electronic calendar is captured but assigned a lower weight value.

Figure 5B:
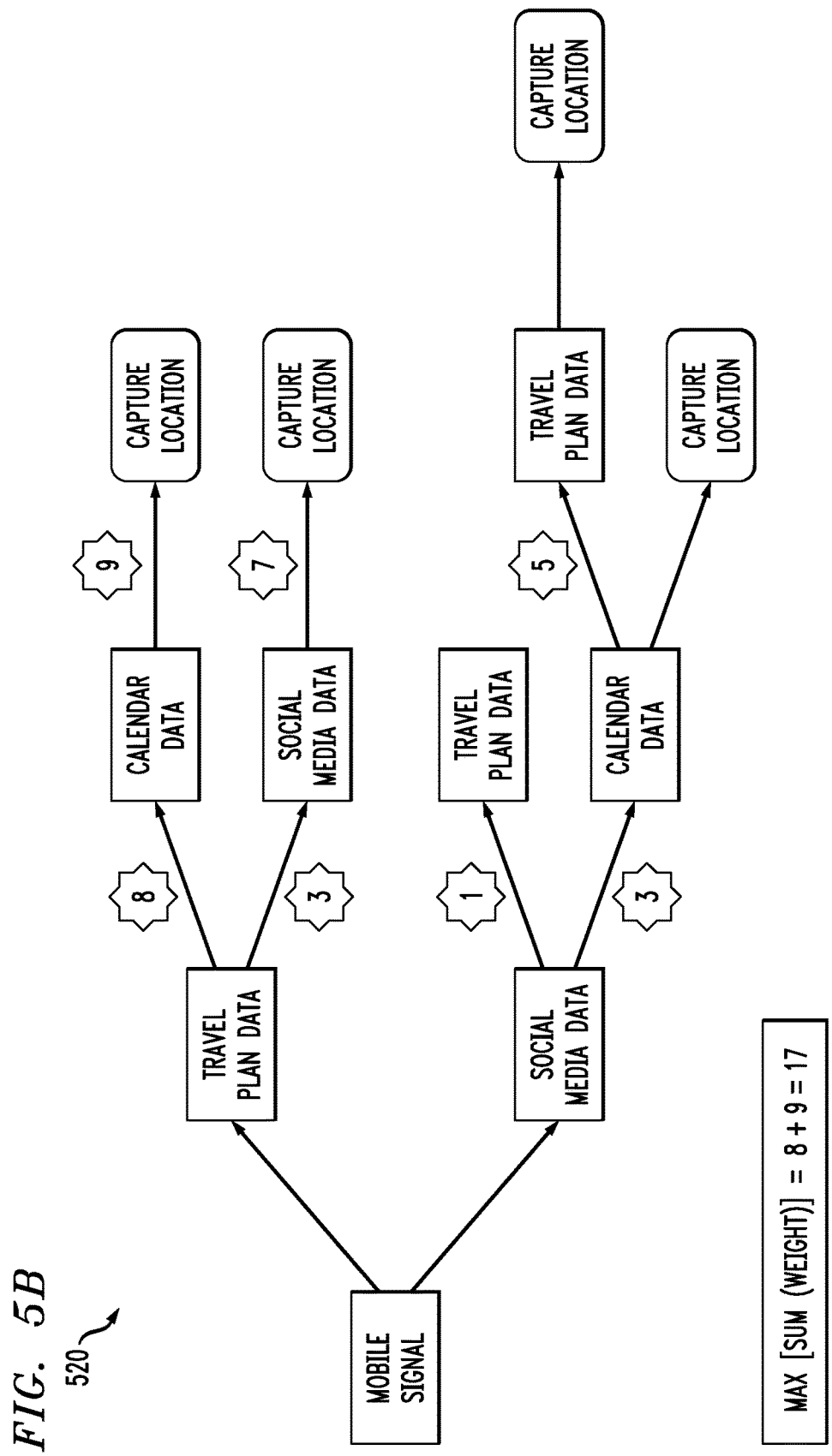
FIG. 5B shows a path flow methodology example, in accordance with one embodiment of the invention.

Embodiments of the invention provide a prediction algorithm to analyze given use cases and plot them into different zones that are defined in accordance to the use case. FIGS. 4A through 4D illustrate embodiments of the prediction algorithm. The different zones guide the algorithm to deep dive into the prediction and analyze the use case more elaborately. In one or more embodiments, after every zone assignment, the above-mentioned weight values are assigned (e.g., integer value on scale of 1-10). The weight values are used in a path flow method for further processing. FIGS. 5A and 5B illustrate an embodiment of the path flow method. For better matching scenarios, a weight value greater than 5 is assigned; for non-matching or lesser matching scenarios, a weight value less than 5 but greater than 0 is assigned; and for average matches, a weight value 5 is assigned. The path flow method is a mathematical flow algorithm which calculates the percentage of correct prediction or possibility for the location tracking. The weight value allotment is done on the basis of scenarios considered in the prediction algorithm. In one embodiment, a mean is calculated for all the possible paths. The path with the greatest sum mean value is chosen for the final prediction result. In another embodiment, the highest path sum is selected as the final prediction result.

Turning now to FIGS. 4A through 4D, a prediction methodology is shown, in accordance with one embodiment of the invention. FIG. 4A illustrates the prediction algorithm 400. It is determined what location a mobile signal of a mobile device of the subject entity is coming from, including: a base city; a known city other than base city (city visited, city in entity's travel history); city associated with travel plans; unknown location (new location or continuously changing location). Box 401 is a legend which defines the entity location-predictive weight values that can be assigned to each data scenario in each location (A denoting a low weight value, B denoting a medium or average weight value, and C denoting a high weight value). Box 402 shows example data scenarios in an unknown location which are assigned a low weight value. Box 404 shows example data scenarios in a travel plan location which are assigned a medium weight value. Box 406 shows example data scenarios in a known city location which are assigned a high weight value. Box 408 shows example data scenarios in a base city location which are assigned a high weight value.

FIG. 4B shows exemplary weight value assignments 420 of various data scenarios when the location captured is confirmed as the base city (home city) of the subject entity. FIG. 4C shows exemplary weight value assignments 440 of various data scenarios when the location captured is confirmed as a known city (other than base city of the subject entity). FIG. 4D shows exemplary weight value assignments 460 of various data scenarios when the location captured is confirmed as a travel location of the subject entity.

FIG. 5A shows a path flow methodology 500, in accordance with one embodiment of the invention. As described above, the portions of obtained activity-related data form a plurality of data paths. The assigned weight values along each data path of obtained activity-related data are added to compute a plurality of data path weight values. These data path weight values are used to select the predicted location of the subject entity.

Thus, as shown in FIG. 5A, the sums of weight values of all paths are computed in step 502. The largest sum is identified in step 504. The location associated with the path having the largest sum is selected, in step 506, as the optimal predicted location of the subject entity. An example 520 of the methodology is shown in FIG. 5B. The numbers on each line represent assigned weight values. Note that the top path adds up to 17, and is thus selected as representing the best predicted location of the subject entity at a particular time.

Figure 6B:
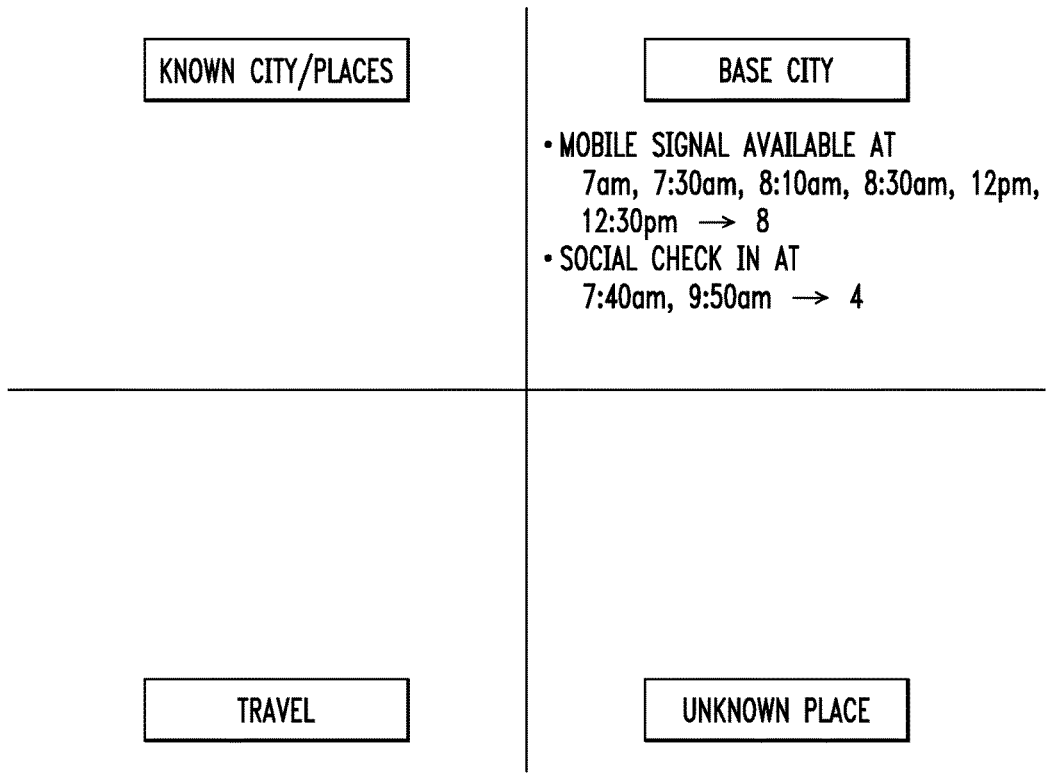
FIGS. 6B and 6C show a first use case example, in accordance with one embodiment of the invention.

FIG. 6A shows a data sheet 600 with location data for one or more use case examples with respect to a subject entity known as "Mark." FIGS. 6B through 6G illustrate zone assignments associated with several use case examples.

Figure 6C:
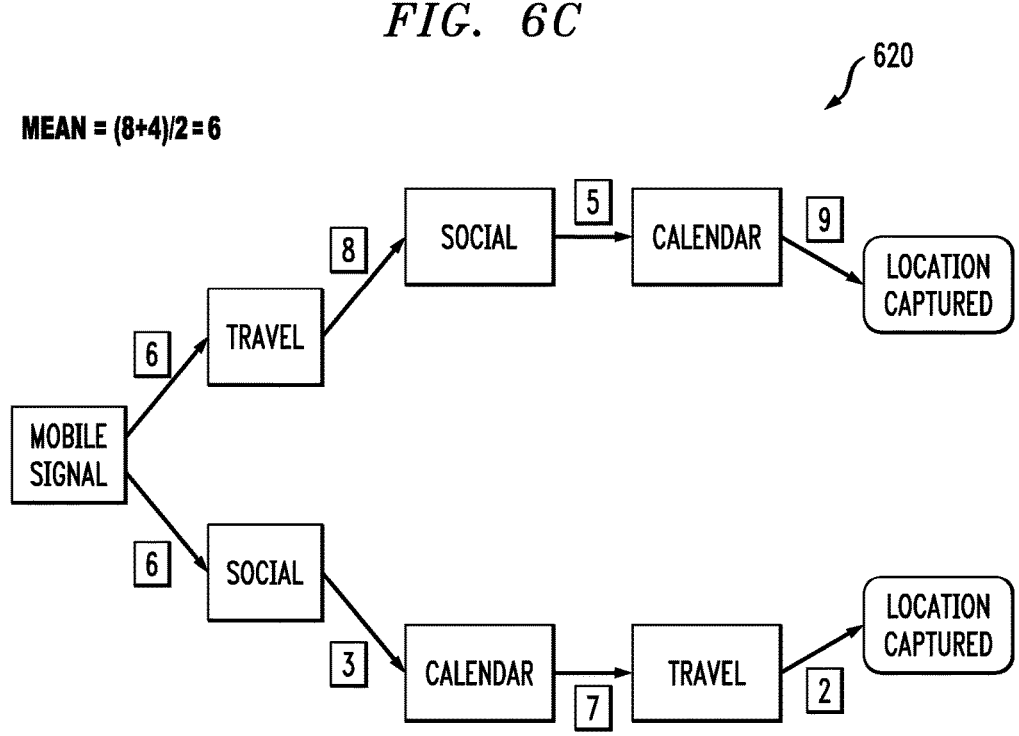

FIGS. 6B and 6C show a first use case example 610, in accordance with one embodiment of the invention. In this use case, we want the system to predict where Mark was until 2:15 pm. It is shown that a mobile signal attributed to a mobile device of Mark was detected in his base city (Hopkinton, Mass.) and, in particular, at a home location (Woody Island Road). This signal was detected at various times prior to 2:15 pm (6 times between 7 am and 12:30 pm). Thus, the mobile signal is assigned a weight value of 8. Mark also checked in on a social media site at 7:40 am and 9:50 am. This is given a lower weight value of 4 because it is less recent than the mobile signal (i.e., social site check in is further removed from 2:15 pm than the last mobile signal captured.). FIG. 6C shows a path flow computation 620 for a similar scenario regarding Mark. Note that the data paths are assigned weight values as explained above. The top path has the largest sum, 28 out of a possible 40 (assuming 10 is the largest weight value that can be assigned and there are 4 weights assigned along the path). Thus, the percentage of weight is (28/40)*100=70%. So, the system (i.e., data analytics engine 110 in FIG. 1) predicts that there is a 70% possibility/chance that Mark was between Woody Island Road (home location) and South Street Road (work location) until 2:15 PM.

Figure 6E:
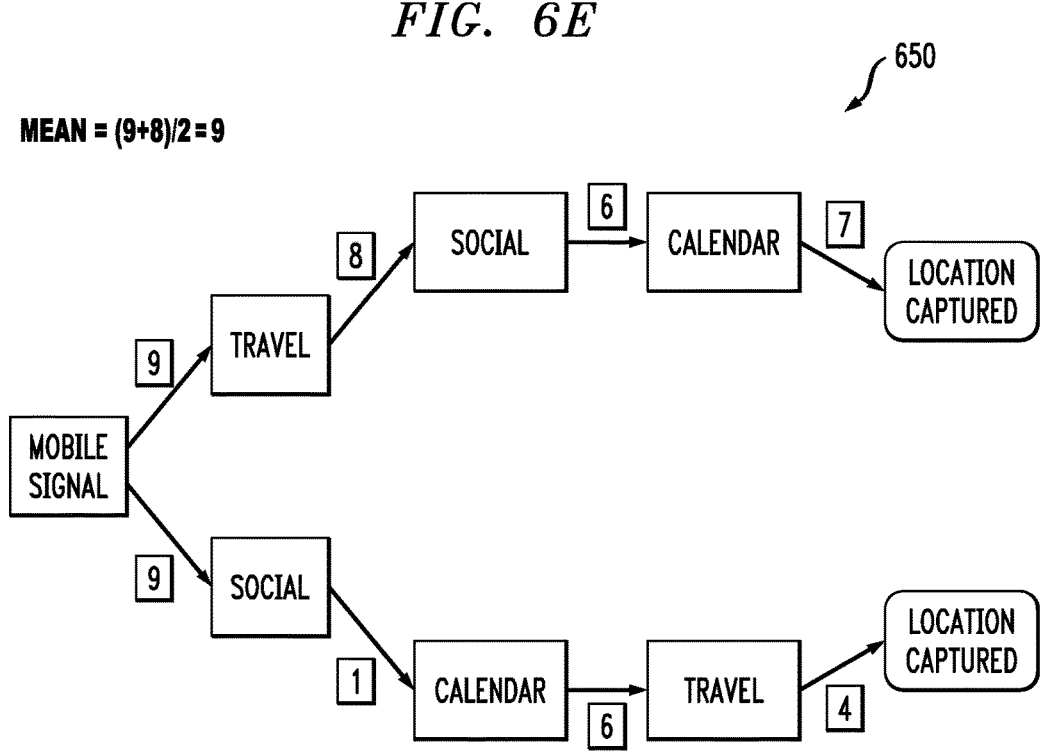

FIGS. 6D and 6E show a second use case example 640, in accordance with one embodiment of the invention. In this use case, we want the system to predict where Mark was around 7 pm. Based on the zone assignments in FIG. 6D, the path flow 650 in FIG. 6E is generated. Following a similar rationale as the analysis in the previous use case example, the result here is that there is a 75% possibility that Mark will be in Boston around 7 pm.

Figure 6F:
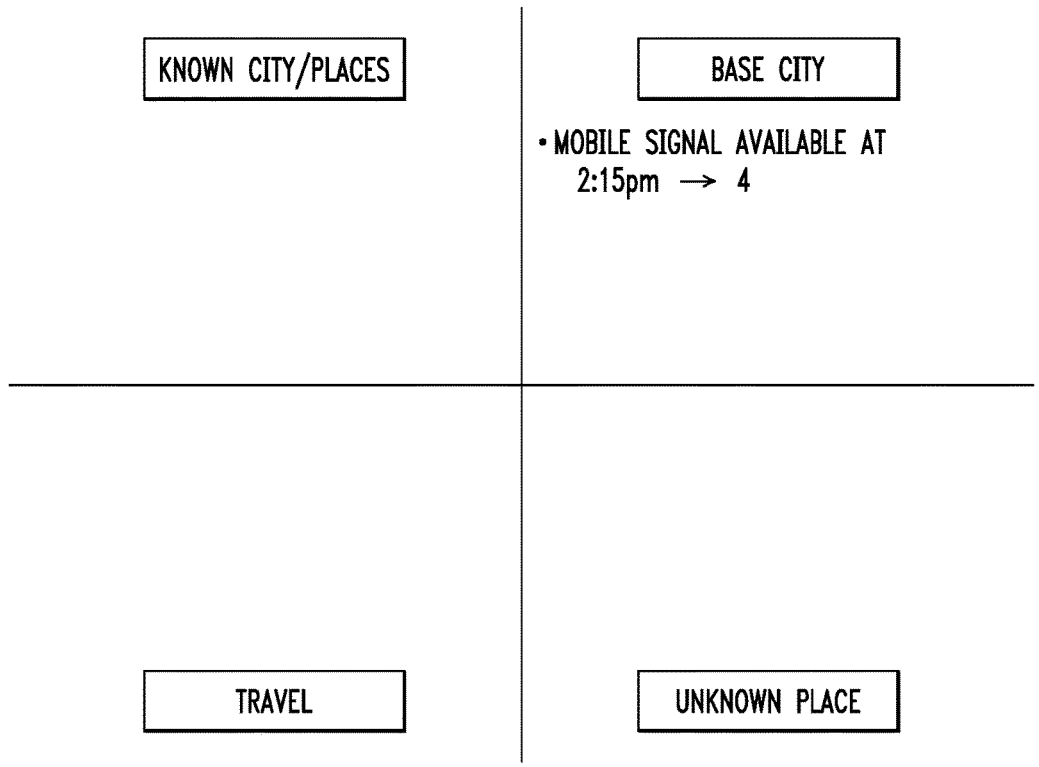
FIGS. 6F and 6G show a third use case example, in accordance with one embodiment of the invention.
Figure 6G:
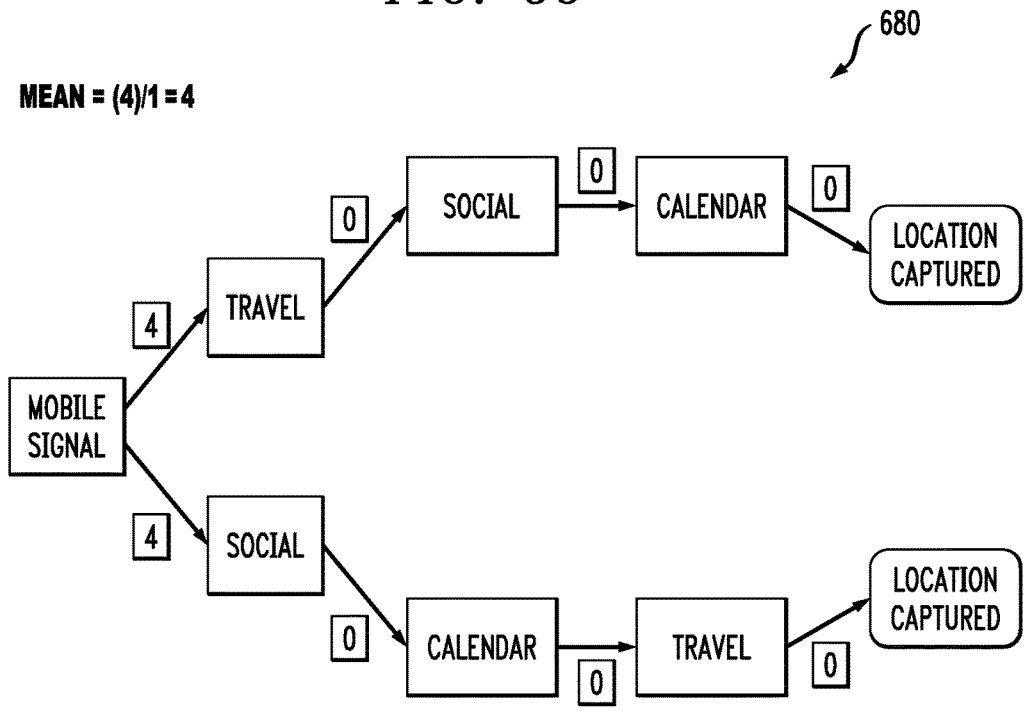

FIGS. 6F and 6G show a third use case example 670, in accordance with one embodiment of the invention. In this use case, we want the system to predict where Mark is at exactly 2:15 pm. Based on the zone assignments in FIG. 6F, the path flow 680 in FIG. 6G is generated. Following a similar rationale as the analysis in the previous use case examples, the result here is that there is a 10% possibility that Mark is at South Street Road at exactly 2:15 pm.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
obtaining data corresponding to one or more activities associated with a subject entity, wherein the one or more activities are associated with respective temporal parameters;
determining at least one location of the subject entity for a selected instance or time period based on the Obtained data, wherein the at least one location of the subject entity comprises at least one of a past, present and future location of the subject entity, and wherein the determination comprises:
assigning weight values to respective portions of the obtained data based at least in part on the temporal parameters, wherein the weight values range between a low entity location-predictive weight value to a high entity location-predictive weight value, and wherein the portions of the data form a plurality of data paths;
adding the assigned weight values along each data path to compute a plurality of data path weight values;
selecting the at least one location of the subject entity based on a selection of one of the plurality of data path weight values;
determining a probability that the subject entity is at the selected location, wherein determining the probability that the subject entity is at the selected location comprises calculating a ratio between the data path weight value corresponding to the selected location of the subject entity and a highest possible data path weight value for the data path corresponding to the selected location of the subject entity; and
assigning the probability to the selected location of the subject entity;
wherein one or more of the above steps are performed by at least one processing device.

2. The method of claim 1, wherein the data associated with the subject entity comprises one or more of electronic calendar data, social media data, mobile device data, travel data, monetary transaction data and purchase data.

3. The method of claim 1, wherein the step of obtaining the data associated with the subject entity further comprises:
evaluating the data associated with the subject entity; and
capturing the data based on the evaluation.

4. The method of claim 3, wherein the evaluating step further comprises:
determining whether a location of a mobile signal associated with a mobile device of the subject entity substantially matches at least one of a home location, a work location and a travel location of the subject entity, such that the determined location is captured in the capturing step.

5. The method of claim 3, wherein the evaluating step further comprises:
determining whether travel location data in the activity-related data substantially matches a travel location booked for the subject entity, such that the determined location is captured in the capturing step.

6. The method of claim 5, wherein the travel location data is obtained from at least one of meeting, appointment and event location data from an electronic calendar of the subject entity.

7. The method of claim 5, wherein the step of assigning weight values further comprises assigning a higher entity location-predictive weight value to travel location data wherein the subject entity is currently enroute.

8. The method of claim 3, wherein the evaluating step further comprises:
determining whether the subject entity has checked in at a location through a social media site, such that the determined location is captured in the capturing step.

9. The method of claim 1, further comprising the step of computing a mean value for each of the plurality of data paths.

10. The method of claim 1, further comprising designating portions of the obtained data into location zones prior to assigning weight values.

11. The method of claim 10, wherein the location zones are based on one or more predetermined use cases associated with the subject entity.

12. The method of claim 1, wherein the step of selecting the at least one location of the subject entity based on a selection of one of the plurality of data path weight values further comprises selecting the location associated with the data path with the highest data path weight value as the location of the subject entity.

13. An article of manufacture comprising a non-transitory processor-readable storage medium having encoded therein executable code of one or more software programs, wherein the one or more software programs when executed by the at least one processing device implement the steps of:

obtaining data corresponding to one or more activities associated with a subject entity, wherein the one or more activities are associated with respective temporal parameters;

determining at least one location of the subject entity for a selected instance or time period based on the obtained data, wherein the at least one location of the subject entity comprises at least one of a past, present and future location of the subject entity, and wherein the determination comprises:

assigning weight values to respective portions of the obtained data based at least in part on the temporal parameters, wherein the weight values range between a low entity location-predictive weight value to a high entity location-predictive weight value, and wherein the portions of the data form a plurality of data paths;

adding the assigned weight values along each data path to compute a plurality of data path weight values;

selecting the at least one location of the subject entity based on a selection of one of the plurality of data path weight values;

determining a probability that the subject entity is at the selected location, wherein determining the probability that the subject entity is at the selected location comprises calculating a ratio between the data path weight value corresponding to the selected location of the subject entity and a highest possible data path weight value for the data path corresponding to the selected location of the subject entity; and assigning the probability to the selected location of the subject entity.

14. An apparatus comprising:
at least one memory; and
at least one processor operatively coupled to the at least one memory and configured to: obtain data corresponding to one or more activities associated with a subject entity, wherein the one or more activities are associated with respective temporal parameters; determine at least one location of the subject entity for a selected instance or time period based on the obtained data, wherein the at least one location of the subject entity comprises at least one of a past, present and future location of the subject entity, and wherein the determination comprises:

an assignment of weight values to respective portions of the obtained-data based at least in part on the temporal parameters, wherein the weight values range between a low entity location-predictive weight value to a high entity location-predictive weight value, and wherein the portions of data form a plurality of data paths; an addition of the assigned weight values along each data path to compute a plurality of data path weight values; a selection of the at least one location of the subject entity based on a selection of one of the plurality of data path weight values, a determination of a probability that the subject entity is at the selected location, wherein the determination of the probability that the subject entity is at the selected location comprises a calculation of a ratio between the data path weight value corresponding to the selected location of the subject entity and a highest possible data path weight value for the data path corresponding to the selected location of the subject entity and an assignment of the probability to the selected location of the subject entity.

15. The apparatus of claim 14, wherein the data associated with the subject entity comprises one or more of electronic calendar data, social media data, mobile device data, travel data, monetary transaction data and purchase data.

16. The apparatus of claim 14, wherein the obtaining of the data associated with the subject entity further comprises an evaluation of the data associated with the subject entity, and a capture of the data based on the evaluation.

17. The apparatus of claim 14, wherein the at least one processor is further configured to compute a mean value for each of the plurality of data paths.

18. The apparatus of claim 14, wherein the at least one processor is further configured to designate portions of the obtained data into location zones prior to assigning weight values.

19. The apparatus of claim 18, wherein the location zones are based on one or more predetermined use cases associated with the subject entity.

20. The apparatus of claim 14, wherein the selection of the at least one location based on a selection of one of the plurality of data path weight values further comprises a selection of the location associated with the data path with the highest data path weight value as the location of the subject entity.

* * * * *